United States Patent [19]
Balzano

[11] Patent Number: 5,567,112
[45] Date of Patent: Oct. 22, 1996

[54] CARGO SHIP OFF-LOADING METHOD AND CARGO CARRIER

[75] Inventor: Joseph A. Balzano, Woodbury, N.J.

[73] Assignee: South Jersey Port Corporation, Camden, N.J.

[21] Appl. No.: 193,243

[22] Filed: Feb. 8, 1994

[51] Int. Cl.$^6$ .................................................... B63B 27/00
[52] U.S. Cl. ...................... 414/786; 212/307; 414/139.9
[58] Field of Search .............................. 414/139.9, 140.3, 414/140.4, 399, 786; 212/220, 307; 294/74, 81.5, 81.55

[56] References Cited

U.S. PATENT DOCUMENTS

| | | | |
|---|---|---|---|
| 1,440,065 | 12/1922 | Donnelly | 414/140.3 |
| 2,452,789 | 11/1948 | Pike | 280/33.05 |
| 2,660,319 | 11/1953 | Dorland | 294/81.55 |
| 2,714,040 | 7/1955 | Schroeder | 301/13 |
| 2,741,489 | 4/1956 | Bigge | 280/44 |
| 2,789,714 | 4/1957 | Norris | 214/506 |
| 2,832,486 | 4/1958 | Clark | 214/506 |
| 3,024,919 | 3/1962 | Willison et al. | 414/139.9 |
| 3,413,027 | 11/1968 | Bohlin et al. | 294/81.55 |
| 3,606,056 | 9/1971 | Morgan | 294/81.55 |
| 3,820,664 | 6/1974 | Lewis et al. | 414/140.3 |
| 4,101,144 | 7/1978 | Ross et al. | 280/423 |
| 4,185,862 | 1/1980 | Slocombe | 294/81.55 |
| 4,262,923 | 4/1981 | Weir | 280/423 |
| 4,737,069 | 4/1988 | Coblentz | 294/74 |
| 5,256,024 | 10/1993 | Ross | 414/483 |

OTHER PUBLICATIONS

Florig Equipment Company, Inc. Price Quote 1 page, 12'Trailer, Dated Mar. 3, 1993.
Florig Equipment Company, Inc. Price Quote 1 page, Step Deck Trailer, Dated Feb. 26, 1993.
ITL Industrial Tires Inc., Specifications 2 pages.
Fruehauf Co. Price Quote, Drop Frame Flat Bed Traiers, Dated Feb. 26, 1993 w/Specs. 2 pages.
Dorsey Trailers, Sales Order, Specifications 3 pages Dated Feb. 26, 1993.

*Primary Examiner*—Michael S. Huppert
*Assistant Examiner*—Thomas J. Brahan
*Attorney, Agent, or Firm*—Volpe and Koenig, P.C.

[57] ABSTRACT

An improved method for unloading break bulk goods from a ship and a cargo transfer carrier for use in the unloading of break bulk goods. The cargo carrier is comprised of a plurality of longitudinal frame members connected by a plurality of cross members with decking affixed thereto to form a horizontal carrier bed. The bed is of sufficient size to accommodate the placement of at least ten, but preferably 14 sling loads of break bulk goods thereon with the allowance for a perimeter work area. A gooseneck portion with tractor attachment means is supported by a first end of the bed and a plurality of wheel assemblies are mounted at the opposite end of the bed. The method comprises positioning the cargo carrier in the debarkation area beneath an unloading position of the ship's crane. At least ten sling loads of break bulk goods are transferred from the ship to the cargo carrier in a single operation. The loaded cargo carrier is removed from the debarkation area and the process is repeated with additional cargo carriers.

15 Claims, 2 Drawing Sheets

CARGO SHIP OFF-LOADING METHOD AND CARGO CARRIER

FIELD OF THE INVENTION

The present invention relates generally to a method for off-loading break bulk goods from a ship utilizing a specially designed cargo carrier. More particularly, the present invention provides a method utilizing a cargo transfer carrier to expedite the process of unloading cocoa beans from a ship and transporting the cocoa beans to a nearby terminal or warehouse for storage.

BACKGROUND OF THE INVENTION

Cargo ships have been used for hundreds of years for the transportation of break bulk goods such as cocoa beans, coffee, sugar and rice. Typically, the goods are shipped from a country where the goods are grown where manual labor may be plentiful and relatively inexpensive to a more industrialized country where the goods are processed and/or consumed and where labor costs become a significant expense.

In the shipping industry, profit is made by keeping the ships on the move without significant delays in docking time for loading and unloading of goods which are being transported. When a ship comes to port, depending on the harbor, pilot tugs or the like may be employed to bring the ship to dock. Once docked, it is relatively impractical and inefficient to move the ship until it is ready to depart for its next destination.

Conventional ships have on-board crane systems to assist in the loading and unloading of cargo. Due to the limited reach of such crane systems, after a ship is docked, there is a relatively fixed embarkation/debarkation area on the dock defined by the reach of the ship's crane.

The shipping of break bulk goods such as cocoa beans from third world nations to the United States provides an example of the conventional shipping process. The cocoa beans are grown abroad, harvested and packed into 150 pound sacks. The sacks are transported to the dock area where they are placed on pallets having lifting slings attached, commonly referred to as a sling and/or sling load of cocoa beans. A typical sling of cocoa beans contains 30–35 sacks.

The slings of cocoa beans are arranged in groups adjacent to each other, the number of slings per group preferably equalling the capacity of the on-board crane which the ship employs. In view of the low labor cost in third world countries, it is not unusual to have the entire preparation operation done by manual labor. Accordingly, when the empty ship docks to pick up a load of cocoa beans, appropriate groups of slings of cocoa beans are in place on the dock to be loaded onto the ship by the ship's crane.

Typically, for a ship with a large capacity crane, only one or two groups of slings can be positioned on the dock in the embarkation area for the ship. As the ship's crane lifts the first group of slings and transfers the group into the ship's cargo hold, more slings of cocoa beans are assembled in the space vacated by the first group. The loading process continues until a desired number of sling groups are aboard the ship. As the groups of slings are placed in the hold of the ship, the groupings of slings remain intact to facilitate off-loading without any unnecessary handling.

Once loaded, the ship departs and sails to its destination such as a port in the U.S. When the ship docks, crews of stevedores stand ready to assist in the off-loading of the cocoa beans. The off-loading commences with the ship's crane being utilized to transfer the groups of slings of cocoa beans from the ship's hold to the dock within the debarkation area defined by the reach of the ship's crane. Once the first group of slings of cocoa beans are in the debarkation area, they must be moved before subsequent sling groups of cocoa beans can be unloaded from the ship's hold.

Conventionally, stevedores employ forklifts to remove the slings from the debarkation area of the dock to a storage area, such as a warehouse. As soon as the slings are released from the crane, forklift operations commence. This method of ship unloading has been employed for many years and has been a reasonably satisfactory method of unloading break bulk goods such as cocoa beans from a ship.

Over the years, the capacity of ship cranes has gradually increased. At one time ship crane capacity was on the order of the 6–8 slings. That capacity has increased with newer cranes having the capacity of 10, 12 or 14 sling loads. Currently, the fourteen sling capacity crane is the largest crane used in commercial shipping of cocoa beans.

Applicant recognized that an alternative to the conventional off-loading method was needed to take better advantage of the larger capacity cranes now in use in commercial shipping. Applicant further recognized that the conventional dock handling procedures were in fact problematic, limiting to off-loading time and unnecessarily labor/cost intensive. For example, where a six sling capacity crane was used in off-loading, stevedores using forklifts could relatively easily remove the cocoa beans slings from the debarkation area without impeding the efficient utilization of the ship's crane. However, additional stevedore crew and forklifts were required to remove fourteen sling loads of cocoa beans from the debarkation area to the storage area to keep pace with the unloading of cocoa beans fourteen slings at a time with a fourteen sling capacity crane. Even with the addition of more stevedore crews and additional forklifts, at additional labor intensive cost, the congestion of forklifts and labor activity on the dock inherently limits the entire off-loading process to approximately 180–200 tons per hour. Accordingly, as set forth below, applicant has developed a new method of off-loading break bulk goods from ships in order to improve off-loading efficiency which has achieved off-loading rates as high as 380–400 tons per hour with lower labor costs.

SUMMARY OF THE INVENTION

The present invention provides an improved method for unloading break bulk goods from a ship which has a crane having at least a ten sling capacity and transporting the goods from the debarkation area in a highly efficient manner. A specially designed a cargo transfer carrier is provided for use in the unloading of the break bulk goods.

The cargo carrier comprises a plurality of longitudinal frame members connected by a plurality of crossmembers with decking affixed thereto to form a horizontal carrier bed. The horizontal bed is of a sufficient size to accommodate the placement of a group of at least ten, but preferably fourteen, sling loads of break bulk goods thereon with allowance for a perimeter work area. A gooseneck portion including a vertical frame portion and an elevated horizontal frame portion with decking affixed thereto is supported by a first end of the bed. Tractor attachment means is affixed to the underside of the horizontal frame portion of the gooseneck. A plurality of wheel assemblies are mounted to the longitudinal frame members at an opposite end of the bed from the gooseneck. Each wheel assembly includes an independently mounted, solid, treadless tires affixed to a maintenance-free hub assembly.

The method comprises positioning the specially designed cargo carrier in the debarkation area directly beneath an unloading position of the ship's crane, using the ship's crane to transfer at least ten sling loads of break bulk goods from the ship to the positioned cargo carrier in a single operation, removing the loaded cargo carrier from the debarkation area, and repeating the process with additional cargo carriers. Preferably, the loaded cargo carriers are taken from the debarkation area directly to a warehouse.

It is an object of this invention to provide an improved method to expedite the process of unloading cargo from a ship.

It is an object of this invention to provide a cargo transfer carrier which can accommodate the size and weight of at least ten, but preferably fourteen or more, sling loads of break bulk goods.

DETAILED DESCRIPTION OF THE PREFERRED EMBODIMENT

Figure 1:
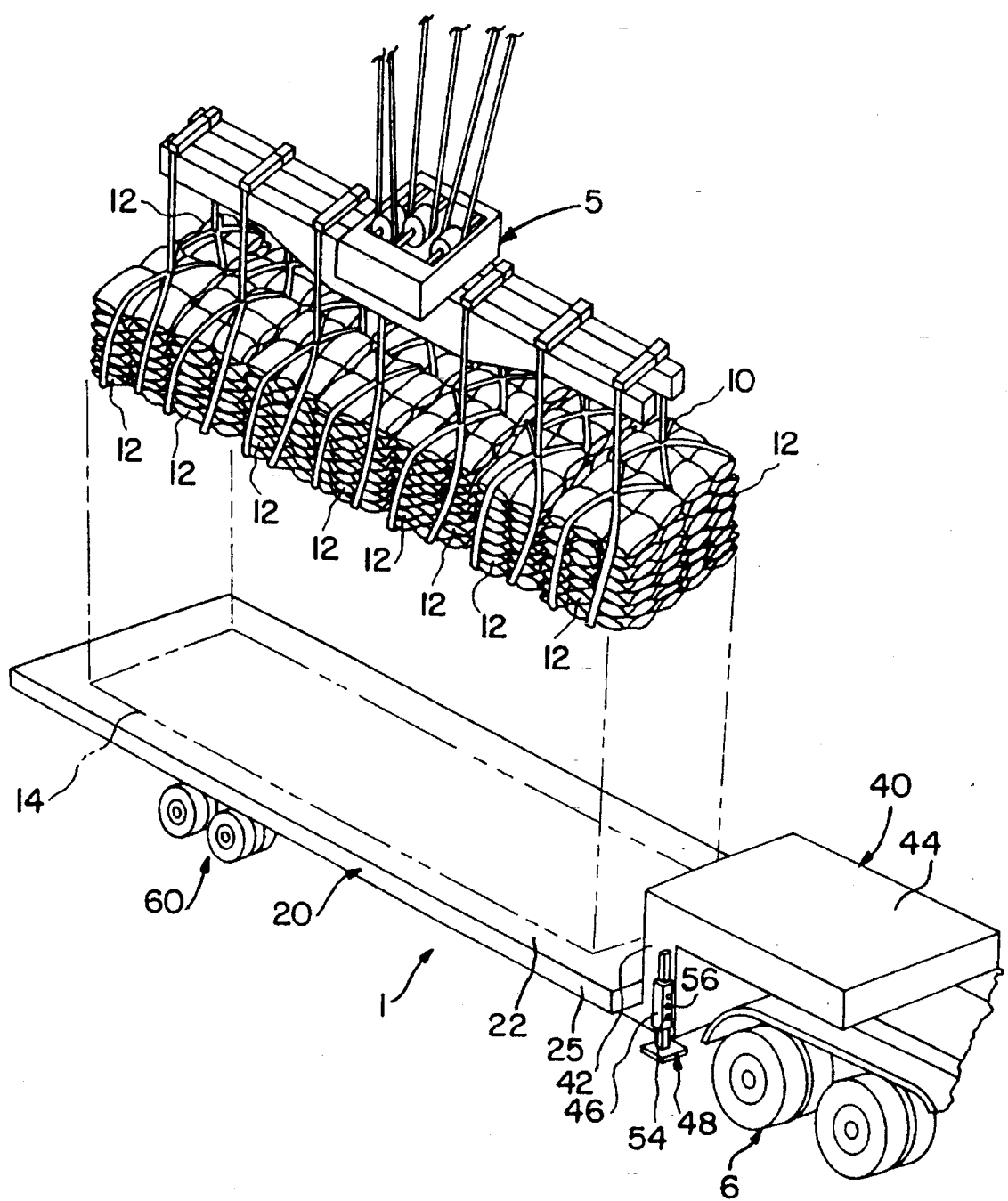
FIG. 1 is a perspective view of a cargo transfer trailer in accordance with the present invention as it is being loaded with fourteen sling loads of cocoa beans.

The ship off-loading method and cargo transfer carrier of the present invention will be described with reference to the drawing figures. In order to provide a clear description of the invention, the ship off-loading method utilizing the cargo transfer carrier will be described first with reference to FIG. 1, followed by a detailed description of the construction of the cargo transfer carrier.

Referring to FIG. 1, the cargo transfer carrier 1 is shown just prior to receiving a group of fourteen sling loads of break bulk cargo as it is being unloaded from a ship. The sling loads of cargo 12 are rigged with slings 10 to the cargo crane 5 of a ship. The cargo transfer carrier 1 is positioned on the dock in the cocoa bean debarkation area i.e. beneath an unloading area of the ship's crane. The cargo crane 5 lifts the slings 10 as a group from the ship's hold and carries them to a position directly above the bed assembly 20 of the cargo carrier 1. After the group of sling loads of cargo is properly positioned above the bed 20 of the carrier 1, the cargo is lowered directly onto the bed 20 and the slings 10 are released. A tractor is connected to the cargo carrier and the cargo is then hauled directly to a nearby terminal or warehouse for storage.

In the preferred mode of use, the break bulk cargo consists of cocoa beans and each sling load weighs approximately 4500 pounds. For maximizing efficiency, at least ten, but preferably 14, sling loads of cargo are handled in each group of slings. By utilizing the cargo transfer carrier 1 for unloading cocoa beans from a ship, off-loading rates of approximately 380 to 400 tons per hour of cocoa beans have been achieved versus 180 to 200 tons per hour off-loading rates achieved by the prior known method. The 380 to 400 tons per hour rate achieved in unloading 14 sling groups proportionally translates to a rate of 270 to 290 tons per hour for unloading break bulk goods in 10 sling groups. Accordingly, even where the method is implemented to unload break bulk goods in 10 sling groups, a substantial improvement over known off-loading methods is achieved.

The cargo transfer carrier 1 shown in FIG. 1 is designed specifically to expedite the unloading process for cocoa beans. The cargo transfer carrier 1 is comprised of a bed assembly 20 with a gooseneck assembly 40 attached at one end. Wheel assemblies 60 are located toward the opposite end of the bed 20 from the gooseneck assembly 40. Jacks 48 are attached on either side of the gooseneck assembly to support the front end of the carrier 1 after it is disengaged from a tractor 6.

The footprint of a single sling load is approximately 5½ feet by 6 feet. The footprint for a group of fourteen sling loads arranged in two rows of seven is approximately 11 feet by 42 feet. Accordingly, the cargo bed is preferably dimensioned approximately 12 feet by 44 feet to accommodate a group of fourteen slings while leaving a perimeter work area open of at least one half foot per side. The perimeter work area permits dock workers easy access to detach the slings from the crane and facilitates unloading the cargo carrier.

Figure 2:
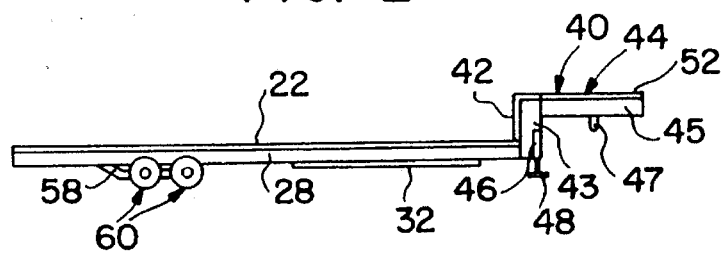
FIG. 2 is a side view of the cargo transfer carrier of FIG. 1.
Figure 3:
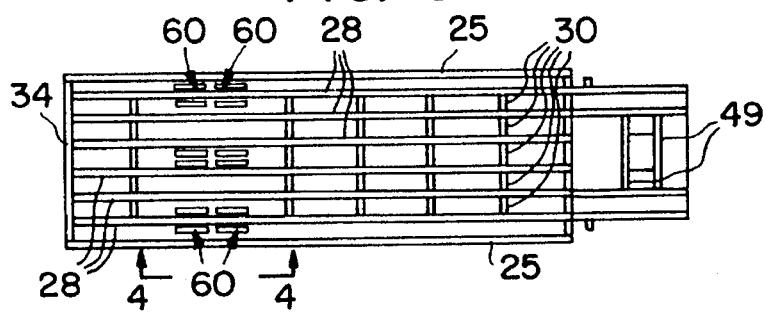
FIG. 3 is a plan view of the cargo transfer carrier of FIG. 1.

Referring to FIGS. 2 and 3, the detailed structure of the carrier 1 is shown. For clarity in FIG. 3 the decking 22 is not shown. The bed assembly 20 is comprised of six longitudinal frame members 28 which run the entire bed length. Cross frame members 30 are connected between the longitudinal frame members 28 at approximately four foot intervals. In order to carry the weight of fourteen sling loads of cargo 12, the longitudinal beams are reinforced by channel sections 32 to increase the moment of inertia (I) of the longitudinal frame members to increase the load carrying capability. In the preferred embodiment, the longitudinal and cross frame members are fabricated from 4"×10"×⅜" rectangular steel tubing. Decking 22 is attached to the frame members 28 and 30 to form the surface of the bed assembly 20. In the preferred embodiment, the decking 22 is fabricated from ½" flat plate. An edge member 25 is attached along both sides of the bed. In the preferred embodiment, the edge member is comprised of 4" square tubing. A closing member 34 is affixed to the rear of the bed assembly. In the preferred embodiment, the closing member is 4"×10"×⅜" channel.

A gooseneck 40 is attached to the front end of the bed assembly 20. Vertical frame members 43 are affixed to the front of the bed assembly. Horizontal frame members 45 are cantilevered from the top end of the vertical frame members 43. Cross members 49 are attached between the horizontal frame members 4B to form the horizontal deck 44. The face plate 42 is affixed to the vertical frame members 43. The elevated deck portion 44 is covered with a grate 52.

Affixed along each side of the outboard vertical frame members 43 are square tubes 46 in which jacks 48 are slidably disposed. Aligned apertures 54 are located in the tube 46 and the jack 48 and a pin 56 is inserted through one set of aligned apertures 54 in a manner known to those skilled in the art to allow for adjustment of the jacks 46 between a raised and a lowered position.

Figure 4:
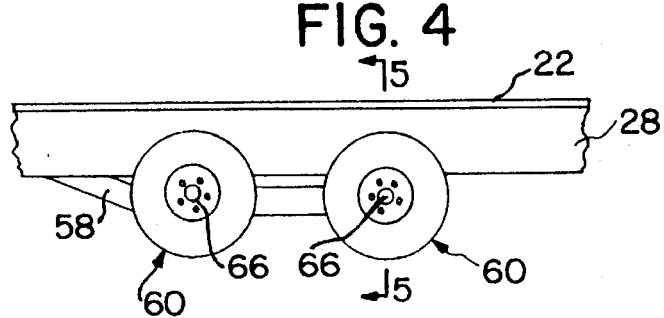
FIG. 4 is an enlarged side view taken along line 4—4 in FIG. 3.
Figure 5:
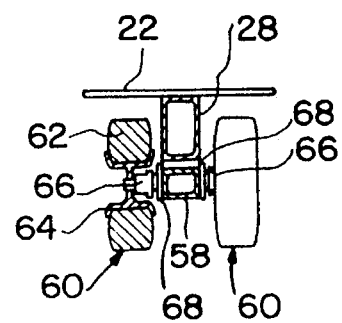
FIG. 5 is a section view taken along line 5—5 in FIG. 4.

Referring to FIGS. 4 and 5, the wheel assemblies 60 are shown in detail. The wheel assemblies 60 are arranged in two rows of six wheels each. The wheel assemblies 60 are mounted to frame members 58, which are affixed to the underside on longitudinal frame members 28 of the bed assembly 20. The wheel assemblies are located at a sufficient distance from the end of the carrier 1 so that the carrier 1 can be pulled up a ramp having a 5° incline without the end of the carrier 1 dragging against the level area at the base of the ramp. In the preferred embodiment, this is approximately 16 feet from the end of the carrier 1.

The wheel assemblies 60 are comprised of solid, treadless tires 62 mounted on heavy-duty metal rims 64. Each tire 62 and rim 64 is mounted on a maintenance free, dual roller bearing, sealed hub assembly 66. The hub assemblies are attached to the wheel support frame members 58. Each wheel assembly 60 is capable of supporting approximately 12,000 pounds. In the preferred embodiment, the wheel support frame member is 12"×12"×½" square tubing and the wheel base is approximately 33½ inches. The tires are ITL "innacush" 7.50×15×6.50 solid smooth tread.

While the cargo transfer carrier 1 and ship off-loading method have been described in terms of the preferred embodiment for use with unloading cocoa beans, it will be appreciated by those skilled in the art that similar cargo transfer carriers and similar ship off-loading methods can be used for other break bulk goods to expedite the ship off-loading process and are within the scope of the present invention. Additionally, based on the overall size of the trailer and the low undercarriage height it is also ideal for the off-loading and movement of other oversized cargo that come off vessels.

I claim:

1. A method for unloading slings loads of break bulk goods from a docked ship which has a crane having at least a ten sling capacity and for transporting the break bulk goods from a debarkation area on a dock adjacent the ship within the reach of the ship's crane, each of said sling loads having a footprint of approximately five and a half feet by six feet, the method comprising:

provFiding a selectively configured cargo carrier having a deck configured for receiving a group of at least ten sling loads of break bulk goods arranged in multiple rows of slings and transporting the goods over land;

positioning said cargo carrier in the debarkation area directly beneath an unloading position of the ship's crane;

using the ship's crane to transfer at least ten sling loads of break bulk goods arranged in multiple rows of slings from the ship to the positioned cargo carrier in a single operation; and removing the loaded cargo carrier from the debarkation area.

2. An unloading method according to claim 1 further comprising:

providing additional selectively configured cargo carriers, each having a deck configured for receiving a group of at least ten sling loads of break bulk goods; and repeating the cargo carrier positioning, crane transference and loaded carrier removal steps with said additional selectively configured cargo carriers.

3. An unloading method according to claim 1 wherein the ship has a crane having at least a 14 sling load capacity, the provided cargo carrier has a deck configured for receiving a group of at least 14 sling loads of break bulk goods and the ship's crane is used to transfer at least 14 sling loads of break bulk goods from the ship to the positioned cargo carrier in a single operation.

4. An unloading method according to claim 3 further comprising:

providing additional selectively configured cargo carriers, each having a deck configured for receiving a group of at least 14 sling loads of break bulk goods; and repeating the cargo carrier positioning, crane transference and loaded carrier removal steps with said additional selectively configured cargo carriers.

5. An unloading method according to claim 1 wherein the break bulk goods are sacks of agricultural products.

6. An unloading method according to claim 5 wherein the break bulk goods are sacks of cocoa beans and each sling of cocoa bean sacks weighs approximately 4,500 pounds.

7. Method for unloading and transporting break bulk goods being unloaded from a ship by a crane capable of lifting 14 sling loads of break bulk goods from the a cargo hold in the ship at one time, and moving the goods to an unloading position over a dock, the method comprising:

(a) providing a cargo transfer carrier having a plurality of longitudinal frame members connected by a plurality of cross members with decking affixed thereto to form a horizontal bed, the horizontal bed being of a sufficient size to accommodate at least 14 sling loads of break bulk goods arranged in double rows of slings, a gooseneck portion including a vertical frame portion and a horizontal frame supported by a first end of the bed, tractor attachment means affixed to the underside of the horizontal frame portion of the gooseneck, and a plurality of wheel assemblies mounted to the bed at an opposite end of the bed from the gooseneck;

(b) positioning the cargo transfer carrier on the dock such that it is directly beneath an unloading position of the crane;

(c) rigging 14 sling loads of break bulk goods on the ship to the crane in double rows of slings;

(d) lifting with the crane the 14 sling loads of break bulk goods from the ship;

(e) positioning with the crane the 14 sling loads of break bulk goods above the cargo transfer carrier;

(f) lowering with the crane the 14 sling loads of goods directly onto the cargo transfer carrier; and (g) releasing the 14 sling loads of goods from the crane directly onto the bed of the cargo transfer carrier such that the goods can be directly moved by the cargo transfer carrier to a warehouse.

8. An unloading method according to claim 7 further comprising:

(h) moving the loaded cargo carrier from said unloading position of the crane;

(i) providing a second cargo transfer carrier as set forth in step (a);

(j) positioning the second cargo transfer carrier such that it is directly beneath said unloading position of the crane; and (k) repeating steps (c)–(g) to unload 14 sling loads of break bulk goods on said second cargo transfer carrier.

9. An unloading method according to claim 7 wherein the break bulk goods are sacks of agricultural products.

10. An unloading method according to claim 9 wherein the break bulk goods are sacks of cocoa beans and each sling of cocoa bean sacks weighs approximately 4,500 pounds.

11. A method for unloading slings of break bulk goods of sacks of agricultural goods from a docked ship which has a crane having the capacity to unload break bulk goods in at least 10 sling load groups at a rate substantially greater than 200 tons per hour and for transporting the break bulk goods from a debarkation area on a dock adjacent the ship within the reach of the ship's crane, the method comprising:

providing cargo carrier for receiving break bulk goods in at least 10 sling load groups arranged in multiple rows of slings from the ship's crane and transporting the goods over land;

using the ship's crane to transfer break bulk goods from the ship to the debarkation area in at least 10 sling load groups arranged in multiple rows of slings at a rate substantially greater than 200 tons per hour; and using said cargo carrier to receive the break bulk goods from the ship's crane in the debarkation area and to remove the break bulk goods from the debarkation area at a rate at least equal to the rate used to transfer the break bulk goods from the ship to the debarkation area.

12. An unloading method according to claim 11 wherein said cargo carrying means comprises a plurality of selectively configured cargo carriers, each having a deck configured for receiving break bulk goods; and said method comprises sequentially positioning said cargo carriers in the debarkation area, receiving break bulk goods on said cargo carriers from the crane at the debarkation area, and removing said cargo carriers from the debarkation area.

13. The method according to claim 11 wherein the ship's crane is operated at a rate of at least 270 tons per hour.

14. The method of claim 11 wherein the ship's crane is operated at a rate of at least 380 tons per hour.

15. An unloading method according to claim 11 wherein the break bulk goods are sacks of cocoa beans and each sling of cocoa bean sacks weighs approximately 4,500 pounds.

* * * * *